United States Patent [19]
Shih

[11] Patent Number: 6,036,104
[45] Date of Patent: Mar. 14, 2000

[54] IRRIGATION SYSTEM

[76] Inventor: Chao-Chang Shih, No. 77, Yung-Tung St., South Dist., Taichung, Taiwan

[21] Appl. No.: 09/215,322

[22] Filed: Dec. 18, 1998

[51] Int. Cl.$^7$ .................................................. B25B 12/12
[52] U.S. Cl. ........................... 239/63; 239/200; 239/276; 239/302; 239/390; 239/447; 239/542; 239/550; 239/600; 239/DIG. 15; 137/78.3; 47/48.5
[58] Field of Search .............................. 239/63, 146, 148, 239/200, 207, 266, 269, 273, 276, 302, 390, 446, 447, 542, 550, 562, 600, DIG. 15; 47/48.5; 137/78.3

[56] References Cited

U.S. PATENT DOCUMENTS

| | | | |
|---|---|---|---|
| 986,003 | 3/1911 | Hohenstein | 239/207 |
| 1,058,566 | 4/1913 | Dunlap | 239/447 X |
| 3,079,089 | 2/1963 | Tomayer | 239/63 |
| 3,841,558 | 10/1974 | Fowler et al. | 239/276 X |
| 3,991,939 | 11/1976 | Maclay | 239/63 |
| 4,317,539 | 3/1982 | Pollock | 239/200 X |
| 4,915,305 | 4/1990 | O'Brien et al. | 239/550 |
| 5,234,161 | 8/1993 | Harrison, Jr. et al. | 239/550 X |

*Primary Examiner*—Andres Kashnikow
*Assistant Examiner*—Steven J. Ganey
*Attorney, Agent, or Firm*—Bacon & Thomas, PLLC

[57] ABSTRACT

An irrigation system includes a water tower connecting with a water storage tank, a lift device mounted on the bottom of the water storage tank for lifting/lowering it, a first suction pipe having a first end portion connecting to the water storage tank, a discharge pipe having a first end portion connecting to the second end portion of the first suction pipe, a first motor controlled valve mounted on the first suction pipe for opening/closing the connection between the first suction pipe and the discharge pipe, a sprinkler head mounted on and connecting to the second end portion of the discharge pipe, a second suction pipe having a first end portion connecting to the water tower and a second end portion connecting the first end portion of the discharge pipe, and a second motor controlled valve mounted on the second suction pipe for opening/closing the connection between the second suction pipe and the discharge pipe.

8 Claims, 7 Drawing Sheets

IRRIGATION SYSTEM

CROSS-REFERENCES TO RELATED APPLICATIONS

Not Applicable.

BACKGROUND OF THE INVENTION

1. Field of the Invention

The present invention relates to an irrigation system.

2. Description of the Related Art

The irrigation process for irrigating and cultivating agricultural crops such as fruit trees includes flooding irrigation, furrow irrigation, sprinkler irrigation, sprinkler irrigation, drip irrigation and subsurface irrigation (or sub-irrigation), wherein sprinkler irrigation and drip irrigation are the most popular irrigation techniques. A conventional irrigation system uses either sprinkler irrigation or drip irrigation only, but does not use both simultaneously, thereby greatly limiting the versatility of the irrigation system. The present invention has arisen to mitigate and/or obviate the disadvantage of the conventional irrigation system.

BRIEF SUMMARY OF THE INVENTION

In accordance with one aspect of the present invention, there is provided an irrigation system comprising a water tower, a water storage tank connecting to the water tower, a lift device mounted on the bottom of the water storage tank for lifting/lowering it, a first suction pipe having a first end portion and a second end portion, the first end portion connecting to the water storage tank, a discharge pipe having a first end portion and a second end portion, the first end portion connecting to the second end portion of the first suction pipe, a first motor controlled valve mounted on the first suction pipe for opening/closing the connection between the first suction pipe and the discharge pipe, a sprinkler head mounted on and connecting to the second end portion of the discharge pipe, a second suction pipe having a first end portion connecting to the water tower and a second end portion connecting the first end portion of the discharge pipe, and a second motor controlled valve mounted on the second suction pipe for opening/closing the connection between the second suction pipe and the discharge pipe.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, an irrigation system in accordance with a first embodiment of the present invention can be used to irrigate and cultivate agricultural crops such as fruit trees (40) and comprises a water tower (10), a water storage tank (15) connecting to the water tower (10), a lift device (14) mounted on the bottom of the water storage tank (15) for lifting/lowering it, a first suction pipe (16) having a first end portion connecting to the water storage tank (15), a discharge pipe (19) having a first end portion connecting to the second end portion of the first suction pipe (16), a first motor controlled valve (160) mounted on the first suction pipe (16) for opening/closing the connection between the first suction pipe (16) and the discharge pipe (19), a sprinkler head (20) mounted on and connecting to the second end portion of the discharge pipe (19), a second suction pipe (17) having a first end portion connecting to the water tower (10) and a second end portion connecting to the first end portion of the discharge pipe (19), and a second motor controlled valve (170) securely mounted on the second suction pipe (17) for opening/closing the connection between the second suction pipe (17) and the discharge pipe (19). The irrigation system further comprises an inlet pipe (11) having a first end portion connecting to the water tower (10), a mediate portion connecting to the first end portion of the second suction pipe (17), and a second end portion connecting to the water storage tank (15), and a booster pump (12) mounted on the first end portion of the inlet pipe (11).

Figure 1:
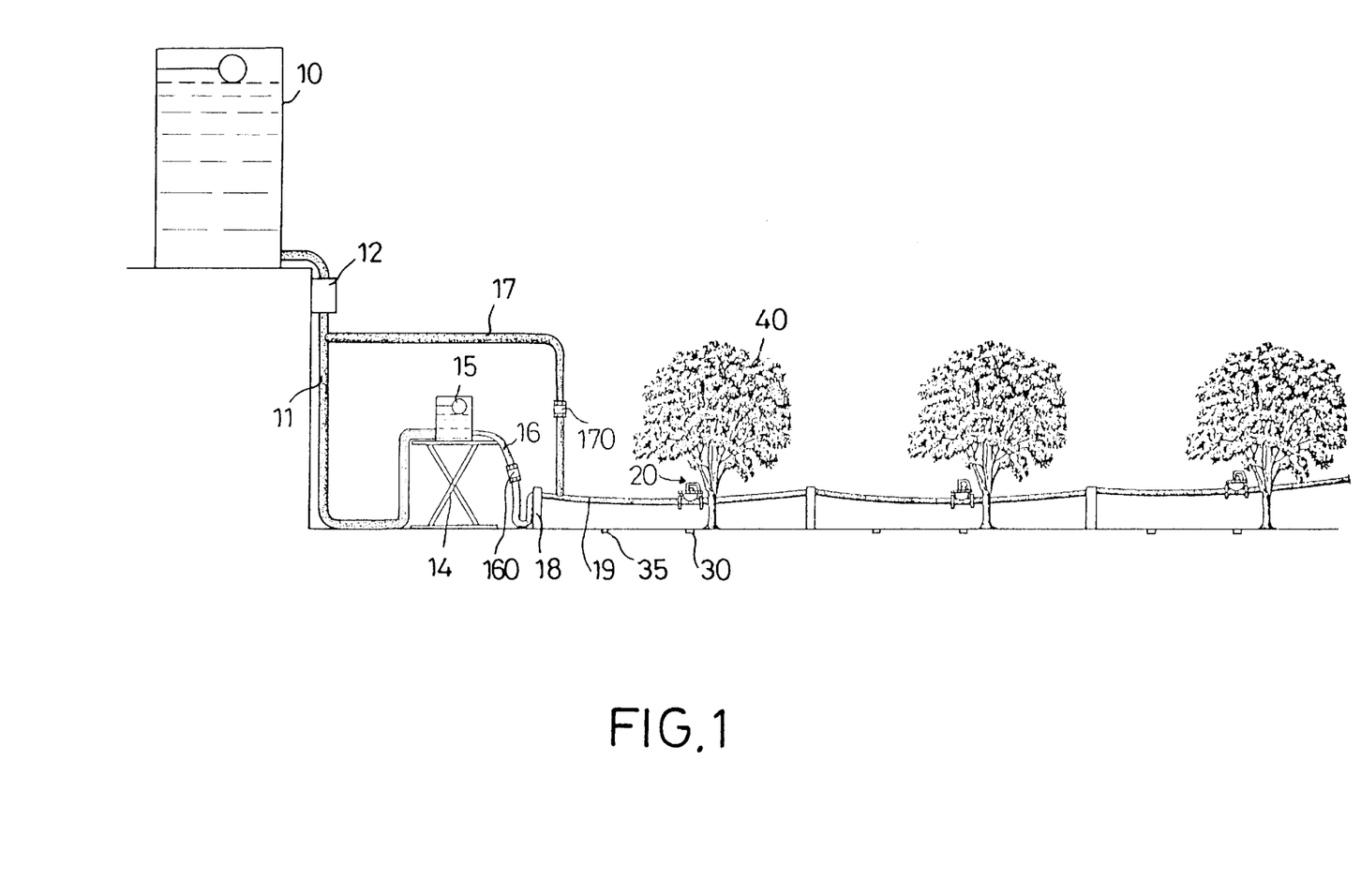
FIG. 1 is a front plan view of an irrigation system in accordance with a first embodiment of the present invention.
Figure 2:
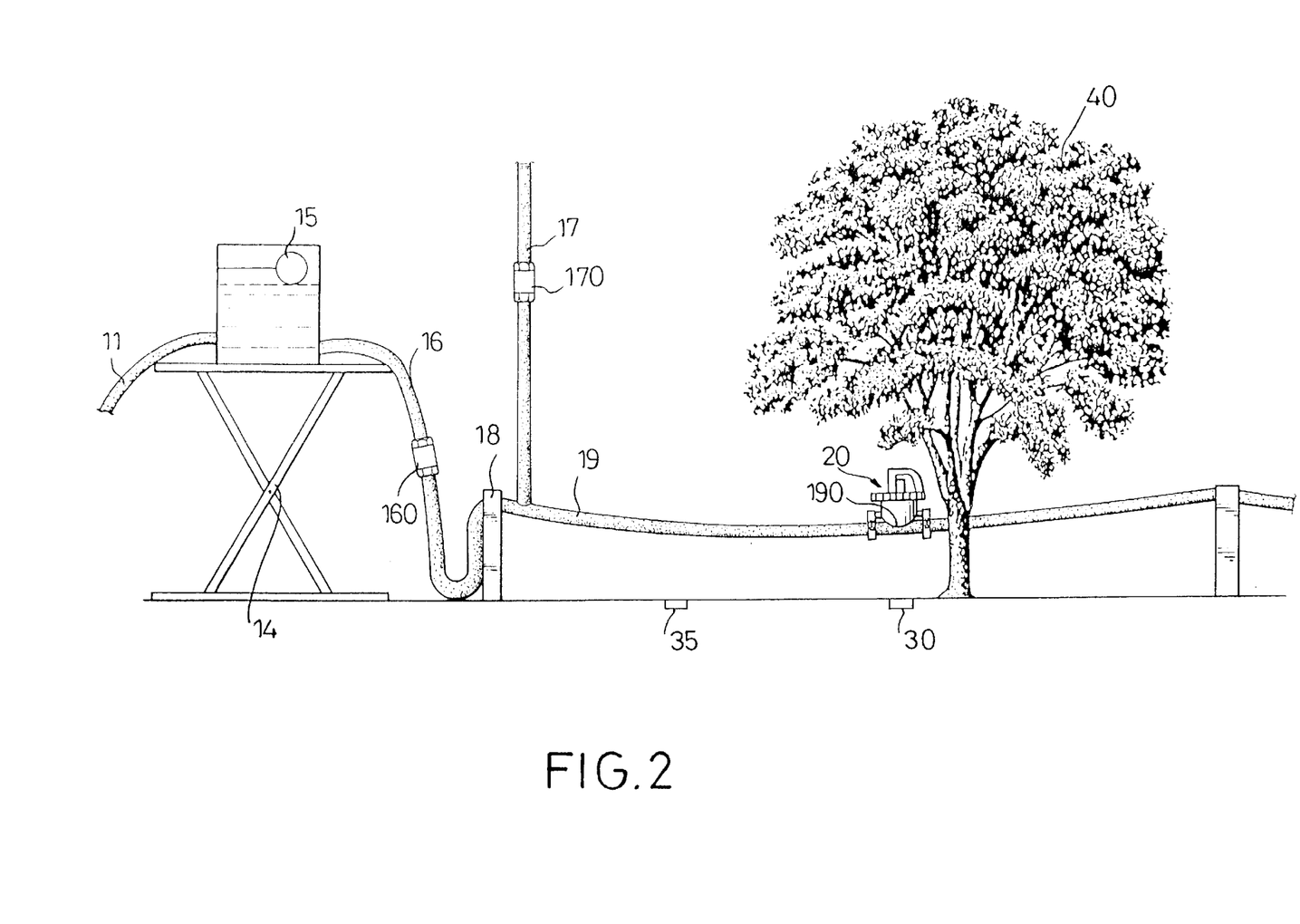
FIG. 2 is a partially enlarged view of the irrigation system as shown in FIG. 1.

The irrigation system further comprises a plurality of upright support posts (18) each for supporting the discharge pipe (19) to keep it off the ground a determined distance.

The irrigation system further comprises a plurality of first humidity sensors (30) each connecting to the first motor controlled valve (160) so as to control the opening/closing operation of the first motor controlled valve (160), and a plurality of second humidity sensors (35) each connecting to the second motor controlled valve (170) so as to control the opening/closing operation of the second motor controlled valve (170).

Figures 3, 5:
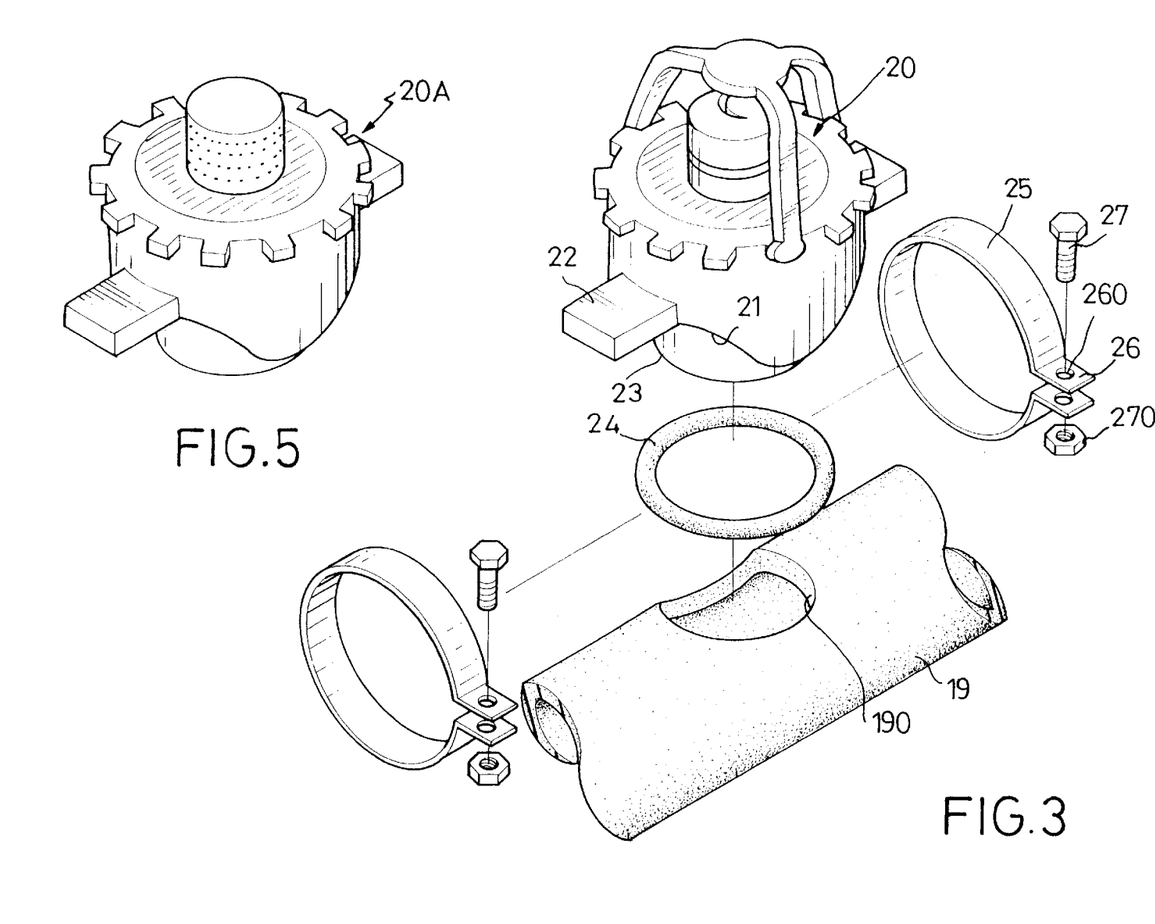
FIG. 3 is a perspective exploded view of the sprinkler head of the irrigation system as shown in FIG. 1.
FIG. 5 is a perspective view of the drip head of the irrigation system in accordance with another embodiment of the present invention.
Figure 4:
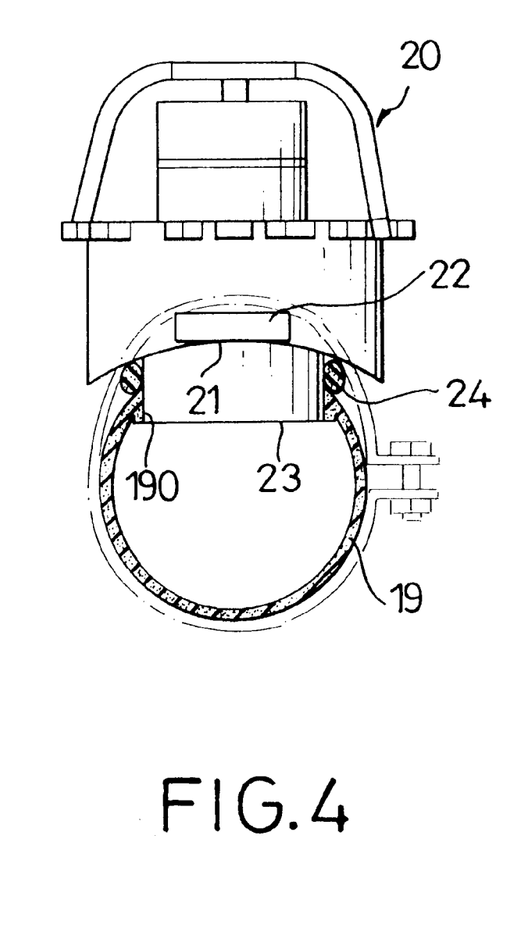
FIG. 4 is a side plan cross-sectional assembly view of the sprinkler head as shown in FIG. 3.

The discharge pipe (19) contains an opening (190) transversely defined therein, and the sprinkler head (20) includes an arcuate abutting surface (21) abutting the outer wall of the discharge pipe (19), an insertion tube (23) extending downward from the abutting surface (21) and received into the discharge pipe (19), and two diametrically opposite lugs (22) each extending outward from the abutting surface (21) and each abutting the outer wall of the discharge pipe (19), and the irrigation system further comprises a O-ring (24) mounted on the insertion tube (23) and located between the abutting surface (21) and the opening (190).

The irrigation system further comprises two hose clamps (25) each mounted on the outer wall of the discharge pipe (19) and each clamping one of the two corresponding lugs (22) on the outer wall of the discharge pipe (19). Each of the two hose clamps (25) has two distal ends each has an ear (26) extending outward and containing a hole (260) therein, and the irrigation system further comprises two locking bolts (27) each in turn extending through the hole (260) of one of the two corresponding hose clamps (25), and two locking nuts (270) each screwed on one of the two corresponding locking bolts (27).

In operation, when the intent is to irrigate the crops (40) using the sprinkler irrigation technique, the second motor controlled valve (170) is operated so as to open the connection between the second suction pipe (17) and the discharge pipe (19), the first motor controlled valve (160) is operated so as to close the connection between the first suction pipe (16) and the discharge pipe (19), and a plurality of sprinkler heads (20) are each mounted on the discharge pipe (19) as shown in FIG. 1 such that water contained in the water tower (10) can be conveyed through the second suction pipe (17) and the discharge pipe (19) by means of the booster pump (12) into each of the sprinkler heads (20) so as to spray the crops with water droplets.

When the humidity value sensed by the second humidity sensors (35) reaches a predetermined value, the second humidity sensors (35) will send a signal to the second motor controlled valve (170) so as to close the connection between the second suction pipe (17) and the discharge pipe (19) and to stop operation of the booster pump (12) such that the sprinkler irrigation process pauses. The preceding procedures can be repeated when the humidity value sensed by the second humidity sensors (35) is lower than the predetermined value, thereby operating the sprinkler irrigation intermittently.

Alternatively, when the intent is to irrigate the crops (40) using the drip irrigation technique, the second motor controlled valve (170) closes the connection between the second suction pipe (17) and the discharge pipe (19), the first motor controlled valve (160) is operated so as to open the connection between the first suction pipe (16) and the discharge pipe (19), and a plurality of drip heads (20A) as shown in FIG. 5 are each mounted on the discharge pipe (19) as shown in FIG. 1 such that water contained in the water tank (15) supplied by the water tower (10) by means of the booster pump (12) can be conveyed through the first suction pipe (16) and the discharge pipe (19) into each of the drip heads (20A) so as to perform the drip irrigation process.

When the humidity value sensed by the first humidity sensors (30) reaches a predetermined value, the first humidity sensors (30) will send a signal to the first motor controlled valve (160) so as to close the connection between the first suction pipe (16) and the discharge pipe (19) and to stop operation of the booster pump (12) such that the drip irrigation process pauses. The preceding procedures can be repeated when the humidity value sensed by the first humidity sensors (30) is lower than the predetermined value, thereby in turn operating the drip irrigation intermittently.

In such a manner, the irrigation system in accordance with the present invention can be used to both perform the sprinkler irrigation and the drip irrigation, thereby decreasing the cost of fitting the irrigation system, and increasing the quality and productions of the crops (40).

Figure 6:
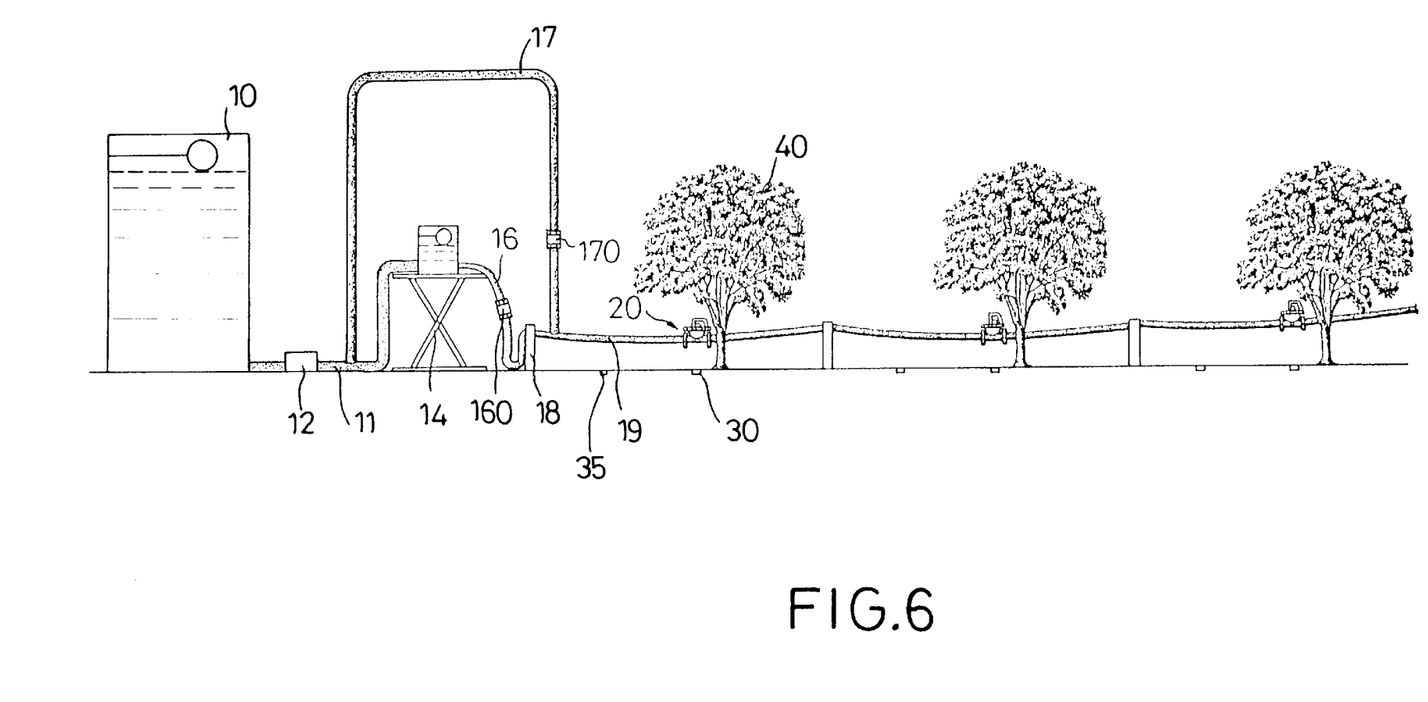
FIG. 6 is a front plan view of an irrigation system in accordance with a second embodiment of the present invention.

Referring now to FIG. 6, in accordance with a second embodiment of the present invention, the water tower (10) can be placed on the ground.

Figure 7:
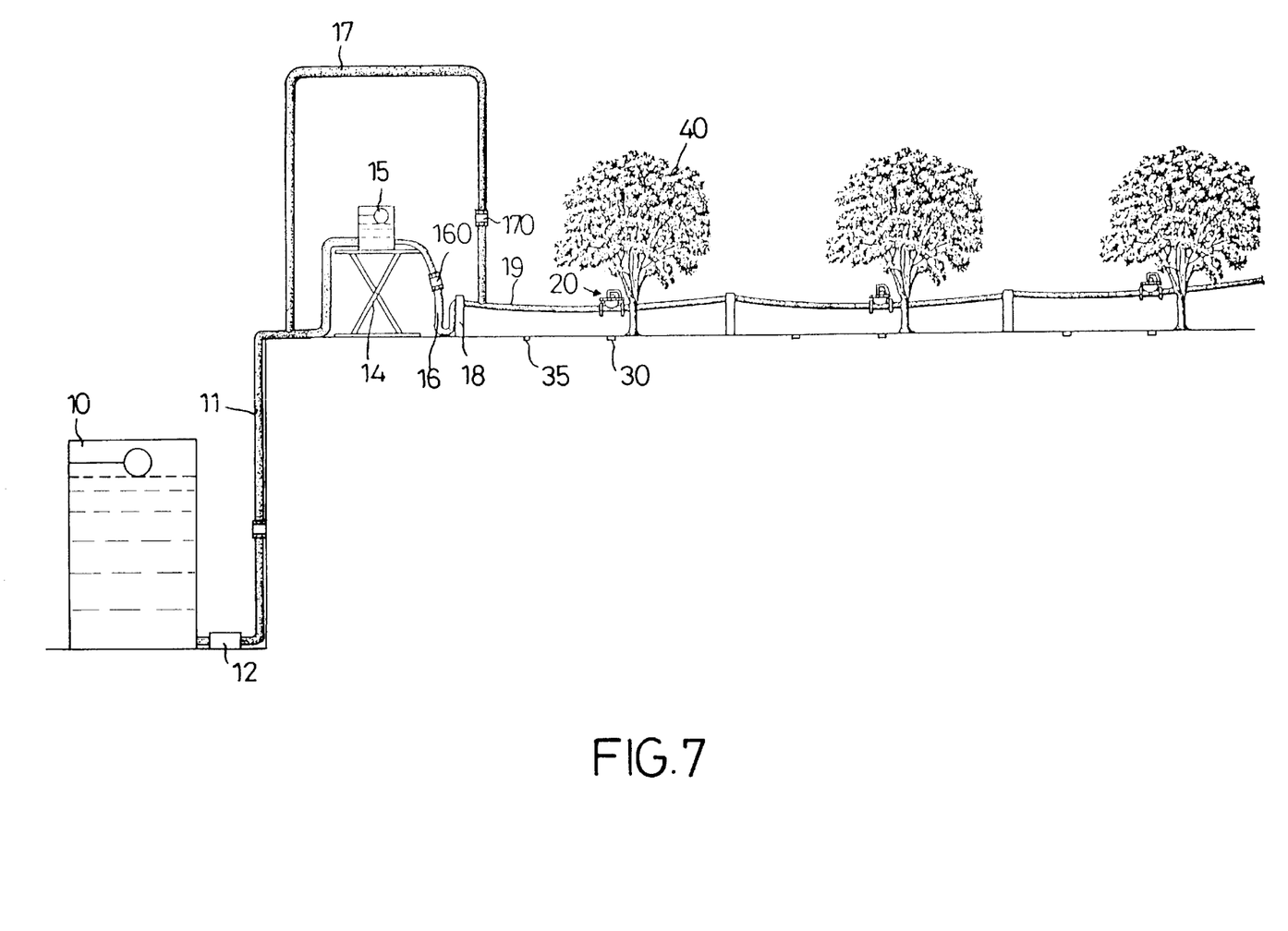
FIG. 7 is a front plan view of an irrigation system in accordance with a third embodiment of the present invention.

Referring now to FIG. 7, in accordance with a third embodiment of the present invention, the water tower (10) can be placed under the ground.

Figure 8:
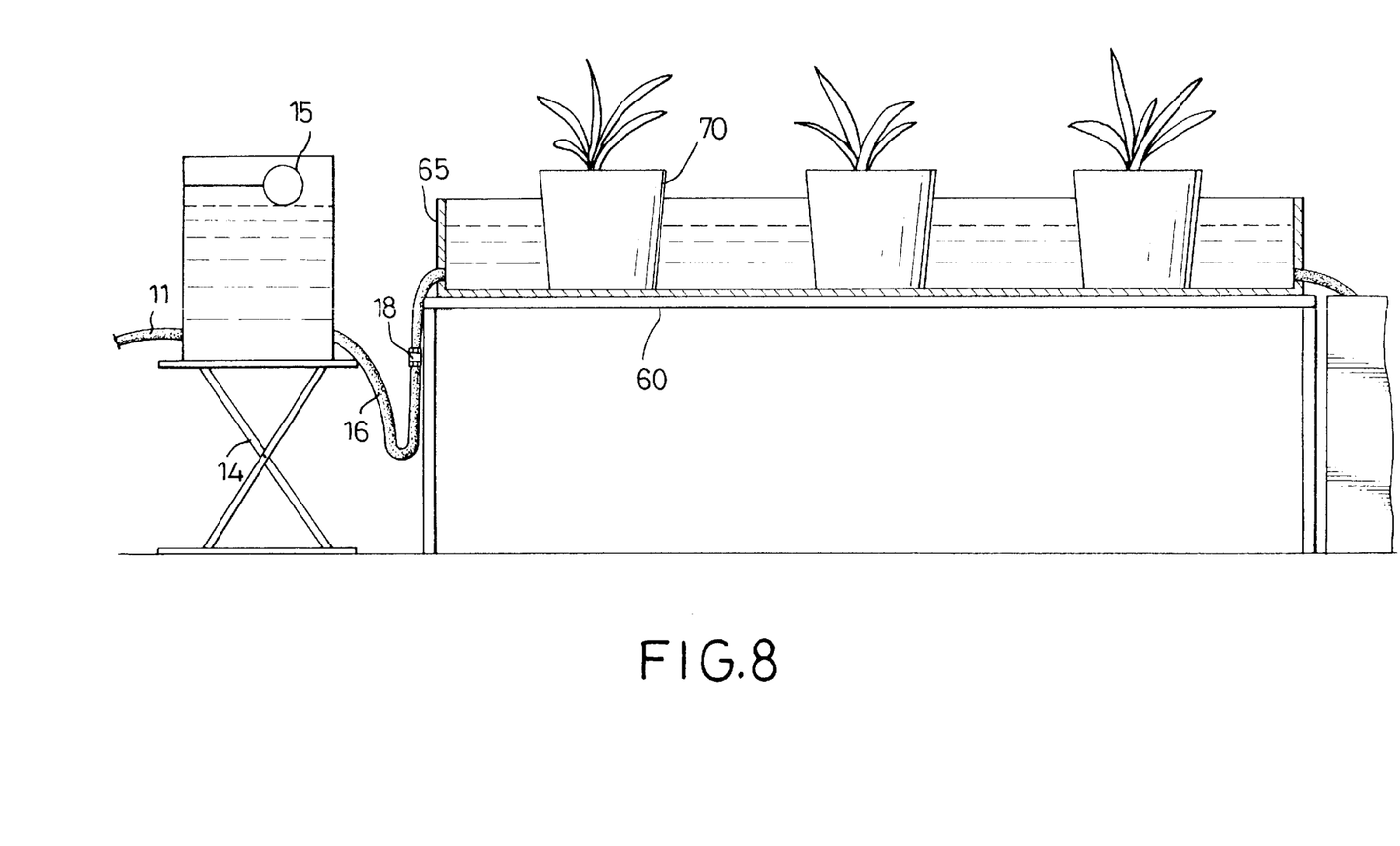
FIG. 8 is a front plan view of an irrigation system in accordance with a fourth embodiment of the present invention.

Referring now to FIG. 8, in accordance with a fourth embodiment of the present invention, the suction pipe (16) is connected to a culture box (65) supported on a support rack (60), in which a plurality of culture containers (70) are received, and a check valve (18) is mounted on the suction pipe (16).

It should be clear to those skilled in the art that further embodiments may be made without departing from the scope and spirit of the present invention.

What is claimed is:

1. An irrigation system comprising:

a water tower (10);

a water storage tank (15) connecting to said water tower (10);

a lift device (14) mounted on the bottom of said water storage tank (15) for lifting/lowering it;

a first suction pipe (16) having a first end portion and a second end portion, said first end portion connecting to said water storage tank (15);

a discharge pipe (19) having a first end portion and a second end portion, said first end portion connecting to said second end portion of said first suction pipe (16);

a first motor controlled valve (160) mounted on said first suction pipe (16) for opening/closing the connection between said first suction pipe (16) and said discharge pipe (19);

a sprinkler head (20) mounted on and connecting to said second end portion of said discharge pipe (19);

a second suction pipe (17) having a first end portion connecting to said water tower (10) and a second end portion connecting said first end portion of said discharge pipe (19); and a second motor controlled valve (170) mounted on said second suction pipe (17) for opening/closing the connection between said second suction pipe (17) and said discharge pipe (19).

2. The irrigation system in accordance with claim 1, further comprising an inlet pipe (11) having a first end portion connecting to said water tower (10), a mediate portion connecting to said first end portion of said second suction pipe (17), and a second end portion connecting to said water storage tank (15).

3. The irrigation system in accordance with claim 2, further comprising a booster pump (12) mounted on said first end portion of said inlet pipe (11).

4. The irrigation system in accordance with claim 1, further comprising an upright support post (18) for supporting said discharge pipe (19) to keep it off the ground a determined distance.

5. The irrigation system in accordance with claim 1, further comprising a humidity sensor (30) connecting to said first motor controlled valve (160) to control the opening/closing operation of said first motor controlled valve (160).

6. The irrigation system in accordance with claim 1, further comprising a humidity sensor (35) connecting to said second motor controlled valve (170) so as to control the opening/closing operation of said second motor controlled valve (170).

7. The irrigation system in accordance with claim 1, wherein said discharge pipe (19) contains an opening (190) transversely defined therein, said sprinkler head (20) includes an arcuate abutting surface (21) abutting the outer wall of said discharge pipe (19), an insertion tube (23) extending downward from said abutting surface (21) and received into said discharge pipe (19), and two diametrically opposite lugs (22) each extending outward from said abutting surface (21) and each abutting the outer wall of said discharge pipe (19), and said irrigation system further comprises two C-shaped hose clamps (25) each mounted on the outer wall of said discharge pipe (19) and each clamping one of said two corresponding lugs (22) on the outer wall of said discharge pipe (19).

8. The irrigation system in accordance with claim 7, wherein each of said two hose clamps (25) has two distal ends each has an ear (26) extending outward and containing a hole (260) therein, and said irrigation system further comprises two locking bolts (27) each in turn extending through said hole (260) of one of said two corresponding hose clamps (25), and two locking nuts (270) each screwed on one of said two corresponding locking bolts (27).

* * * * *